(12) United States Patent
Moon et al.

(10) Patent No.: US 12,359,280 B2
(45) Date of Patent: Jul. 15, 2025

(54) METHOD FOR RECOVERING LITHIUM FROM A WASTE LITHIUM SECONDARY BATTERY USING A PYROMETALLUGICAL PROCESS

(71) Applicant: YOUNG POONG CORPORATION, Seoul (KR)

(72) Inventors: Nam Il Moon, Ulsan (KR); Ho Jo Lee, Gunsan-si (KR); Eung Bae Kim, Cheonan-si (KR)

(73) Assignee: YOUNG POONG CORPORATION, Seoul (KR)

( * ) Notice: Subject to any disclaimer, the term of this patent is extended or adjusted under 35 U.S.C. 154(b) by 113 days.

(21) Appl. No.: 17/914,268

(22) PCT Filed: Jun. 10, 2021

(86) PCT No.: PCT/KR2021/007246
§ 371 (c)(1),
(2) Date: Nov. 10, 2022

(87) PCT Pub. No.: WO2022/234884
PCT Pub. Date: Nov. 10, 2022

(65) Prior Publication Data
US 2024/0209474 A1    Jun. 27, 2024

(30) Foreign Application Priority Data

May 7, 2021 (KR) .................. 10-2021-0059113
Jun. 1, 2021 (KR) .................. 10-2021-0070801

(51) Int. Cl.
*C22B 26/12* (2006.01)
*C01B 25/30* (2006.01)
(Continued)

(52) U.S. Cl.
CPC .............. *C22B 26/12* (2013.01); *C01B 25/30* (2013.01); *C01D 15/04* (2013.01); *C22B 1/24* (2013.01);
(Continued)

(58) Field of Classification Search
CPC .. C22B 26/12; C22B 1/24; C22B 3/44; C22B 7/002; C22B 7/006; C22B 7/005;
(Continued)

(56) References Cited

U.S. PATENT DOCUMENTS

2022/0017990 A1*  1/2022  Scheunis ................ C22B 7/001

FOREIGN PATENT DOCUMENTS

CA      3 144 716 A1     2/2021
CN      107964593 A      4/2018
(Continued)

OTHER PUBLICATIONS

JP-2013091826-A: Espacenet English machine translation (Year: 2013).*

(Continued)

*Primary Examiner* — Adil A. Siddiqui

(57) ABSTRACT

The present invention relates to a method for recovering lithium from a waste lithium secondary battery using a pyrometallurgical smelting method, which comprises a step for melting a waste lithium secondary battery containing nickel, cobalt, copper, and lithium, a flux having a melting temperature of 1,400° C. or less, and a lithium recovery agent to separate and obtain a slag, metal phase and lithium compound, wherein the lithium recovery agent includes at least one of chlorine and fluorine, and wherein the amount of each of nickel, cobalt and copper contained in the metal phase is more than 10 times compared to that of the slag.

18 Claims, 19 Drawing Sheets

(51) Int. Cl.
- *C01D 15/04* (2006.01)
- *C22B 1/24* (2006.01)
- *C22B 3/44* (2006.01)
- *C22B 7/00* (2006.01)
- *H01M 10/54* (2006.01)

(52) U.S. Cl.
CPC ............. *C22B 3/44* (2013.01); *C22B 7/002* (2013.01); *C22B 7/006* (2013.01); *H01M 10/54* (2013.01)

(58) Field of Classification Search
CPC ....... C22B 7/001; C01B 25/30; C01B 25/301; C01D 15/04; H01M 10/54; Y02P 10/20; Y02W 30/84
See application file for complete search history.

(56) References Cited

FOREIGN PATENT DOCUMENTS

| | | | |
|---|---|---|---|
| CN | 112251604 A | 1/2021 | |
| JP | 2011-168858 A | 9/2011 | |
| JP | 2013-506048 A | 2/2013 | |
| JP | 2013-91826 A | 5/2013 | |
| JP | 2013091826 A | * 5/2013 | |
| JP | 2013-535573 A | 9/2013 | |
| JP | 5632169 B2 | 11/2014 | |
| JP | 2019-135321 A | 8/2019 | |
| KR | 10-2013-0059126 A | 6/2013 | |
| KR | 10-2013-0116926 A | 10/2013 | |
| KR | 10-2016-0076021 A | 6/2016 | |
| KR | 10-2020-0065503 A | 6/2020 | |
| WO | 2020/104164 A1 | 5/2020 | |
| WO | 2020/171009 A1 | 8/2020 | |

OTHER PUBLICATIONS

The Extended European Search Report for European Patent Application No. 21931928.2, dated Oct. 4, 2023.

Guo-Xing Ren et al., "Recovery of valuable metals from spent lithium ion batteries by smelting reduction process based on FeO—$SiO_2$—$Al_2O_3$ slag system", Transactions of Nonferrous Metals Society of China, 2017, vol. 27, pp. 450-456, DOI: 10.1016/S1003-6326(17)60051-7.

* cited by examiner

FIG. 3
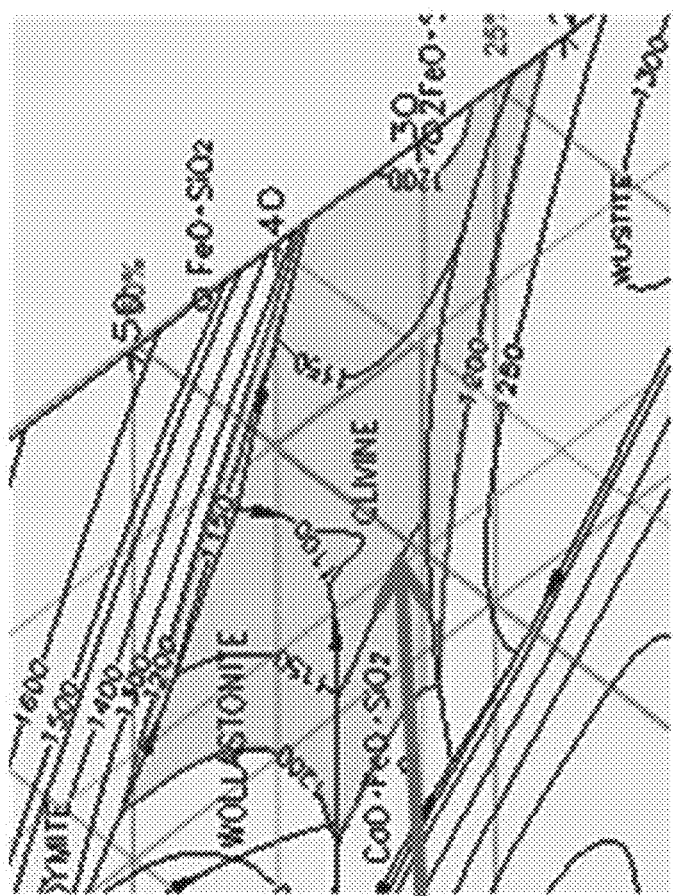
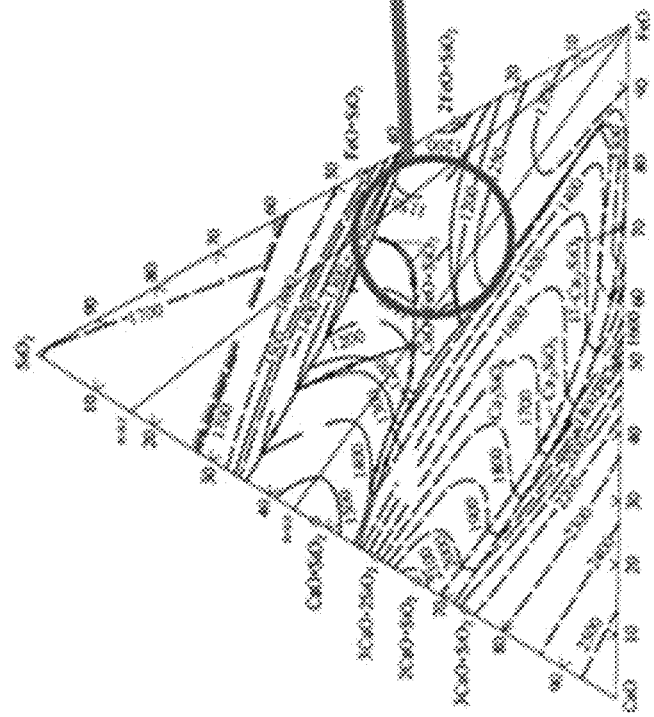

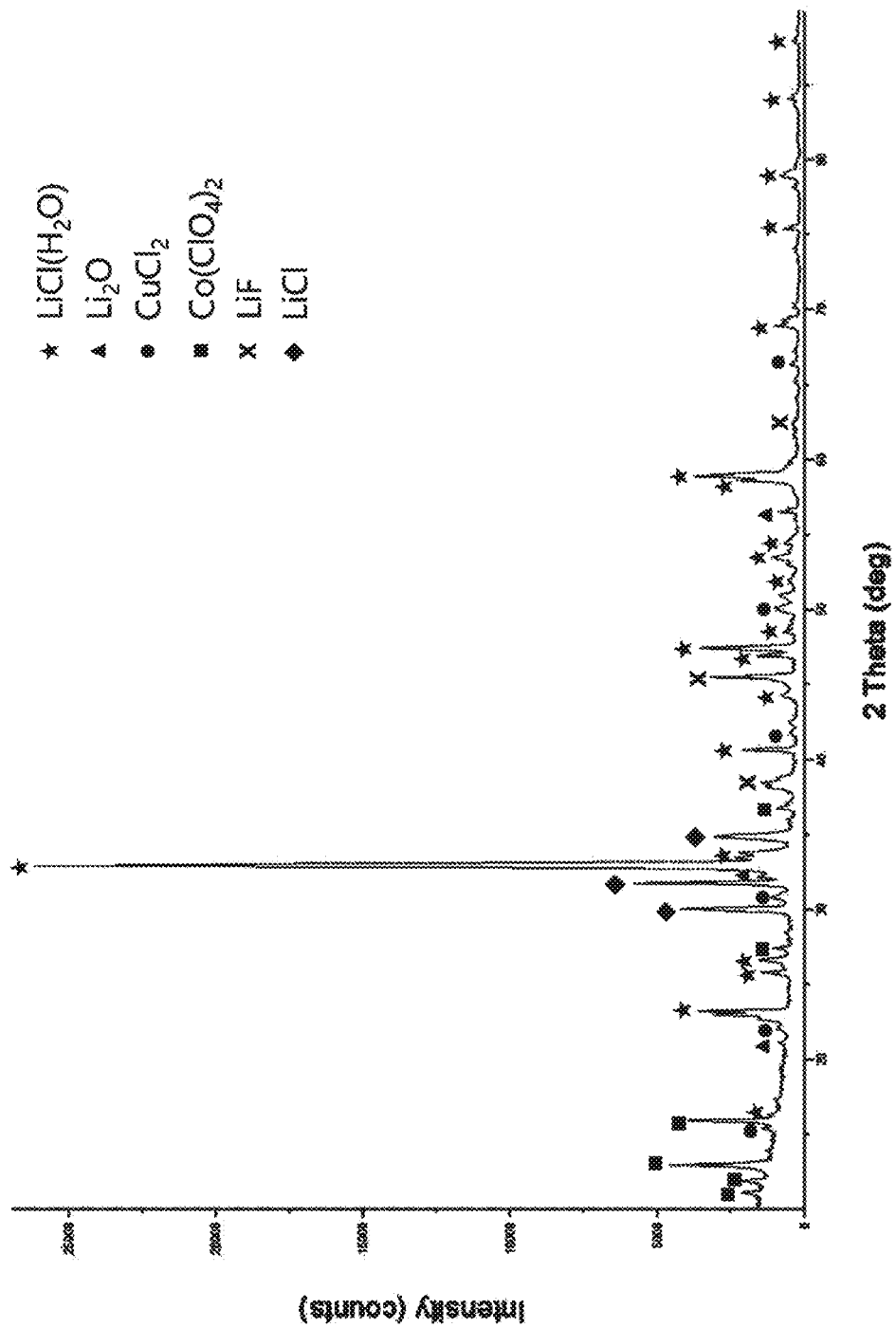

METHOD FOR RECOVERING LITHIUM FROM A WASTE LITHIUM SECONDARY BATTERY USING A PYROMETALLUGICAL PROCESS

TECHNICAL FIELD

The present invention relates to a method for recovering lithium from a waste lithium secondary battery using a pyrometallugical process.

BACKGROUND ART

A large amount of batteries is used in mobile phones, power tools, electric vehicles, etc., and thus, a large amount of waste secondary battery batteries is also generated.

Waste secondary battery batteries contain a large amount of valuable metals such as cobalt, copper and nickel, and recovery of the valuable metals is important.

There are hydrometallugical and pyrometallurgical methods as the method for recovering the valuable metals.

Among them, the hydrometallurgical method is complicated and not eco-friendly because it requires a use of a large amount of chemicals such as sulfuric acid, and the like. The pyrometallurgical method requires a high-temperature process of 3,000° C. or higher, and therefore, there is a problem in that energy consumption thereof is large.

DISCLOSURE

Technical Problem

A purpose of the present invention is to provide a method for recovering lithium from a waste lithium secondary battery using a pyrometallurgical smelting method.

Technical Solution

The above purpose of the present invention is achieved by a method for recovering lithium from a waste lithium secondary battery using a pyrometallurgical smelting method, which comprises a step for melting a waste lithium secondary battery containing nickel, cobalt, copper and lithium, a flux having a melting point of 1,400° C. or less, and a lithium recovery agent to separate and obtain a slag, metal phase, and lithium compound, wherein the lithium recovery agent includes at least one of chlorine and fluorine, and wherein the amount of each of nickel, cobalt, and copper contained in the metal phase is more than 10 times compared to that of the slag.

The flux may have a melting temperature of 1,250° C. or less.

The total content of nickel, copper, and cobalt may be 20% by weight to 60% by weight.

The waste lithium secondary battery may include 15 to 30% by weight of nickel, 3 to 10% by weight of cobalt, and 1 to 7% by weight of copper, and may further include 20 to 40% by weight of carbon.

The waste lithium secondary battery may include a battery module, and the battery module may be melted without crushing.

The waste lithium secondary battery may include a battery module, and the battery module may be molten after being crushed or pulverized in an inert atmosphere without being discharged.

The flux may include FeO, $SiO_2$ and CaO, and the total content of FeO, $SiO_2$, and CaO may be 65 weight % to 85 weight %.

The melting point of the flux may be 1,000° C. to 1,250° C., the $SiO_2$ may be 50 to 80 parts by weight and the CaO may be 15 to 40 parts by weight, relative to 100 parts by weight of the FeO, and the flux may be used in 100 parts by weight to 800 parts by weight relative to 100 parts by weight of the waste lithium secondary battery.

The flux may be obtained from a zinc residue melting process.

In the melting step, oxygen may be oxidized by lancing the carbon.

The melting point in the melting step may be 1,400° C. to 1,550° C., and 90 weight % to 99 weight % of nickel, cobalt and copper included in the waste lithium secondary battery may be included in the metal phase, respectively.

The lithium compound may include at least one of LiCl and LiF.

The lithium compound may include LiCl, and the molar ratio of Cl/Li upon melting may be from 1.3 to 2.5.

The lithium recovering agent may include at least one of $CaCl_2$), $CaF_2$, $FeCl_3$, $CuCl_2$, $FeF_2$, and $CuF_2$.

The method may further include steps of hydrolyzing the lithium compound; adjusting the pH so that the pH of the filtrate of the hydrolysis rises; and adding phosphate to the filtrate after said pH adjustment to obtain lithium phosphate.

The hydrolysis may be performed using only water.

The hydrolysis may be performed in a state where the pH is lowered, and the pH may be lowered by using of an acid.

In the hydrolysis, the pH is 1 to 4 and may be adjusted by using at least one of sulfuric acid, nitric acid and hydrochloric acid.

Advantageous Effects

According to the present invention, a method for recovering lithium from a waste lithium secondary battery using a pyrometallurgical smelting method is provided.

DESCRIPTION OF DRAWINGS

FIG. 3 is a phase equilibrium diagram for explaining the composition of the flux in the present invention.

FIG. 8 shows the analysis result of dust in the experimental example of the present invention.

MODE FOR DISCLOSURE

Figure 1:
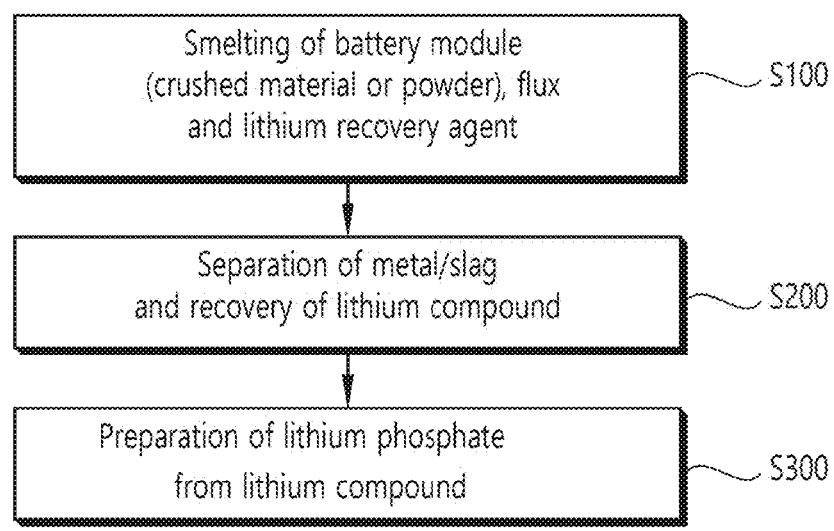
FIGS. 1 and 2 are flowcharts of the recovery method according to an embodiment of the present invention.
Figure 2:
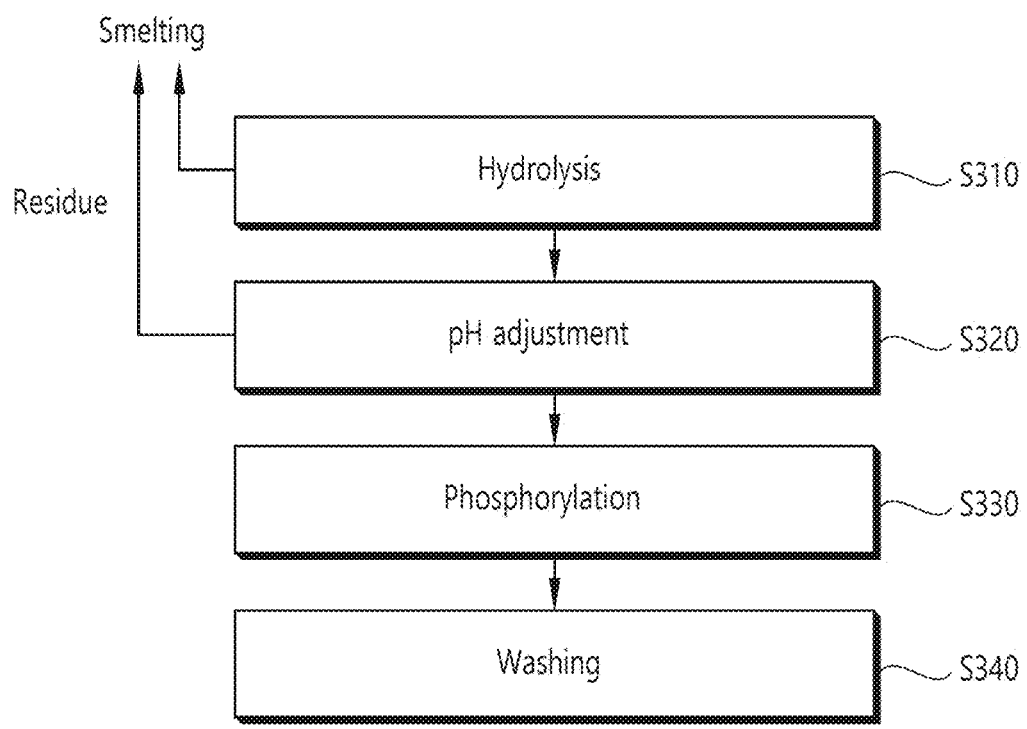

A recovery method according to the present invention will be described with reference to FIGS. 1 and 2.

First, the waste lithium secondary battery, the flux and the lithium recovery agent are melted (S100).

The waste lithium secondary battery is not limited thereto, but may be obtained from a battery pack of waste secondary battery for an electric vehicle.

Waste lithium secondary batteries can be obtained from battery packs discharged after use not only from battery cells used in small devices, but also from mid- to large-sized batteries such as xEV (Hybrid Electric Vehicle, Plug-in Hybrid Electric Vehicle, Electric Vehicle, etc.) or ESS (Energy Storage System), and the like. The configuration of the battery pack is a form in which several battery modules are integrated, and the battery module has a form in which several battery cells are integrated again. In the present invention, a battery module obtained by separating the battery packs may be used, and may be in the form of a crushed material obtained by crushing the battery module or in the form of a crushed powder.

A battery pack, a battery module, and a battery cell will be further described as follows.
1. Battery pack: The final form of the battery system installed in an electric vehicle. Equipped with various control and protection systems such as battery modules and cooling devices.
2. Battery module: An assembly in which a number of cells are collected and placed in a frame to protect the battery cells from external shock, heat, etc.
3. Battery cell: The basic unit of a battery, being capable of charging and discharging anode, cathode, separator, etc.

After disassembling into the battery module through disassembly (removing the cable, aluminum case, etc.), the process of obtaining shreds or powder from the battery pack of the waste secondary battery of an electric vehicle may include a process of crushing or pulverizing in $N_2$ or Ar, or a vacuum atmosphere, which can control fire, explosion, etc. of the battery module without discharging.

The crushed material or powder may include lithium, cobalt, nickel, copper, aluminum, manganese, iron and carbon. The valuable metals to be recovered in the present invention include cobalt, nickel and copper among them. In the crushed material or powder, 15 to 30% by weight of nickel, 3 to 10% by weight of cobalt, and 1 to 7% by weight of copper may be included. Carbon is an anode material of a waste secondary battery, and may be 20 to 40 weight % in crushed material or powder. Carbon plays a role in reducing $LiCoO_2$, $LiCO_3$, NiO, CoO, etc. contained in the crushed material or powder. When there is insufficient carbon in the crushed material or powder, coal for reduction can be additionally used before or during melting.

Flux has a lower melting point than crushed material or powder. The melting point of crushed material or powder varies depending on the component composition, but in the case of the valuable metal to be recovered, it is approximately 1,400° C. to 1,500° C. The melting point of the flux is 1,200° C. or less or 1,250° C. or less, and specifically 900° C. to 1,200° C., 900° C. to 1,250° C., 1,000° C. to 1,250° C. Alternatively, the melting point of the flux may be 100° C. to 500° C., or 100° C. to 300° C. lower than the melting point of the valuable metal to be recovered.

The flux may be a by-product of the zinc residue melting process.

The zinc residue melting process means the process for injecting flux ($SiO_2$, $CaCO_3$, etc.), oxygen, and coal into the zinc residue ($ZnO \cdot Fe_2O_3$, $ZnO \cdot SiO_2$, etc.) remaining through the roasting and leaching of zinc ore, and completely re-treating the zinc residue with a high temperature and a strong stirring force, and recovering zinc and clean slag (FeO—$SiO_2$—CaO).

Hereinafter, in the present invention, unless otherwise specified, % indicates weight %.

The flux includes FeO, $SiO_2$ and CaO, and the total content of FeO, $SiO_2$ and CaO in the flux may be 60 to 100 weight %, 60 to 90 weight %, or 65 weight % to 85 weight %. The balance of the flux may include copper, alumina, lead, chromium and/or zinc.

In the flux, $SiO_2$ may be 50 to 80 parts by weight and CaO may be 15 to 40 parts by weight relative to 100 parts by weight of FeO. In this composition, as shown in FIG. 3, a mixture of FeO, $SiO_2$ and CaO has a melting point of 1250° C. or 1200° C. or less.

The flux may be used in 100 parts by weight to 1,000 parts by weight, 100 parts by weight to 600 parts by weight, or 100 parts by weight to 400 parts by weight, relative to 100 parts by weight of the crushed material or powder.

If the amount of the flux used is less than 100 parts by weight relative to 100 parts by weight of the crushed material or powder, the phase separation between the metal phase and the slag becomes poor. If the amount of flux is excessive, the amount of waste becomes a problem because the amount of slag after processing is large.

The lithium recovery agent includes chlorine and fluorine, and lithium in the crushed material or powder is recovered in the form of a lithium compound by the lithium recovery agent. The lithium compound is LiCl and/or LiF.

The lithium recovery agent may be $CaCl_2$), $CaF_2$, $FeCl_3$, $CuCl_2$, $FeF_2$ or $CuF_2$, and in particular $CaCl_2$) may be used. During the melting process, Fe and Ca in the lithium recovery agent are utilized as slag, and copper is recovered in the metal phase (alloy phase) to lower the melting point.

Figure 4:
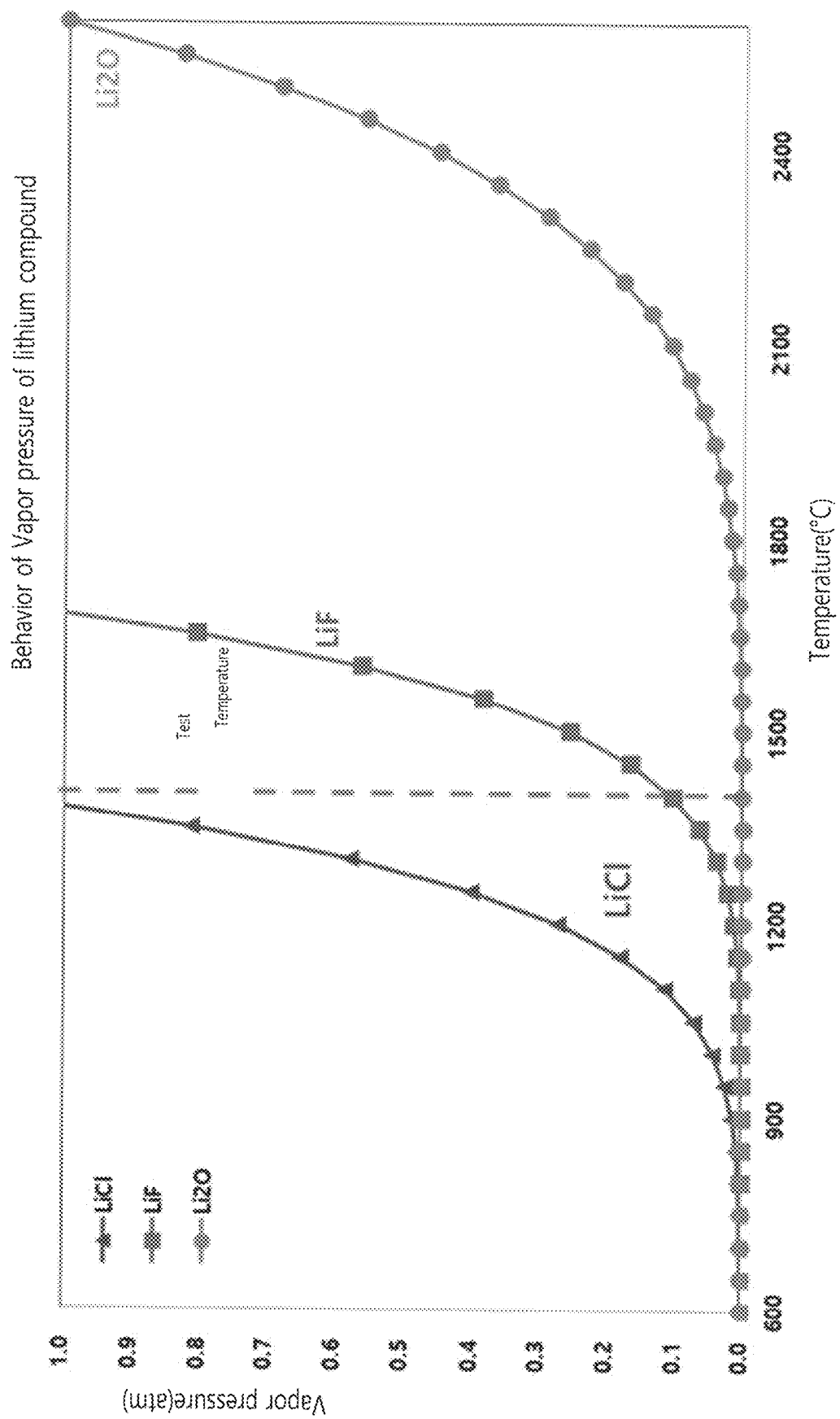
FIG. 4 is a view for explaining the behavior of the lithium compound.

FIG. 4 shows the vapor pressure when lithium is compounded with other elements.

The vapor pressure of LiCl at 1,400° C. represents about 0.95 atm and that of LiF represents about 0.1 atm, which is related to the volatilization rate. LiCl volatilizes well, and LiF has a relatively low volatilization rate, but if the melting time is increased, LiF in the melting bath can be recovered by up to about 90%. Here, the volatilization rate is defined as the ratio of volatilized Li to the total added Li.

Also, LiCl and LiF start to react and volatilize from about 1,000° C.

When the lithium compound is LiCl, the lithium recovery agent may be added so that the molar ratio of Cl/Li is 1.3 to 2.5.

The temperature of pyrometallurgical smelting is 1,600° C. or less, specifically 1,400 to 1,600° C., or 1,400 to 1,550° C.

The temperature of such pyrometallurgical smelting is lower than the melting point of the valuable metal to be recovered due to the flux. Due to the flux, it is possible to recover at a low temperature, so that it is possible to simplify the facility, save energy, etc. Because the melting point of the flux is lower than the temperature of pyrometallurgical smelting, the flux has a low viscosity in pyrometallurgical smelting and absorbs and separates $Al_2O_3$, $MnO_2$, C, and $Fe_2O_3$, which are impurities of crushed material or powder, and phase separation is performed as a metal phase/slag.

As the crushed material or powder component is melted by pyrometallurgical smelting, the metal phase and slag are separated by the difference in specific gravity, and some of it becomes dusted.

Melting may be performed in a batch operation mode or a continuous operation mode. The melting time of the batch operation mode is 3 to 10 hours, or 5 to 7 hours, and in the case of the continuous operation mode, the average residence time may be 1 to 5 hours or 1 to 2 hours. It oxidizes carbon by lancing oxygen upon melting.

During the melting process, the range of the equilibrium oxygen partial pressure in the furnace must be operated within the conditions of 10-5.3 atm or less and 10-11.2 atm or more in the melting temperature region, and in this range the oxidation of Co is inhibited and thus recovered as the metal, and Fe is oxidized and recovered as slag.

Reduced valuable metals and remaining impurities (Al, Mn, Fe, etc.) in slag are separated into metal phase/slag. The separation principle is the difference in specific gravity between the metal phase and the oxide, and the slag (oxide) is divided into the upper part and the metal phase into the lower part.

The metal to be recovered is mainly located in the metal phase. 90 to 99 weight % of nickel, cobalt and copper contained in the crushed material or powder, respectively, is located in the metal phase. Alternatively, the amount of nickel, cobalt and copper respectively located in the metal phase is 10 times or more of the amount located in the slag, specifically, 10 to 20 times, 10 to 50 times, or 10 to 100 times.

On the other hand, iron and manganese among the metals which are not the subject for recovering are mostly located in the slag, and 90 to 99 weight % of iron and manganese contained in the crushed material or powder may be located in the slag.

As described above, according to the present invention, cobalt, nickel and copper can be recovered as a metal phase through pyrometallurgical smelting at a low temperature. The metal phase may then be separated for each metal component through atomizing, leaching, and the like.

Next, the metal phase (alloy) and the slag are separated and the lithium compound is recovered (S200).

The metal phase (alloy) and the slag are separated during the melting process, and the metal phase is located at the bottom due to the difference in density.

Lithium compounds are captured in the form of dust. There are two methods of capturing: a method of recovering solid-state dust by using a ceramic filter, and a method of capturing dust in a scrubber (water). LiCl has high solubility in water (900 g/L) and is mostly soluble in water, and LiF has low solubility (about 1 g/L) and exists as a slurry state in water.

Thereafter, lithium phosphate is prepared from the lithium compound (S300).

This process will be described with reference to FIG. 2.

First, the lithium compound recovered in the form of dust is hydrolyzed (leached with water) (S310). Lithium compounds are the forms which are easily hydrolyzed, whereas impurities such as Mn, Al, and Fe are mainly present in the form of oxides, and Ni, Co, etc. are present in the form of metals, so that only lithium compounds can be selectively leached. In addition, $CoCl_2$, $CaCl_2$, $MnCl_2$, etc. synthesized in the smelting process may be leached in the hydrolysis process.

Hydrolysis may be carried out for 1 hour to 10 hours at a solid-liquid ratio of 1:2 to 1:30 under stirring, and the temperature may be from room temperature to 50° C.

The hydrolysis may be performed in a state in which the pH is lowered using an acid. Hydrochloric acid, sulfuric acid, or nitric acid may be used to lower the pH, but the present invention is not limited thereto. The lowered pH may be from 1 to 4, from 1 to 3.5, from 1 to 3 or from 2 to 3.5.

When the pH is lowered, $Li_2O$, LiF, etc. are additionally leached to improve lithium recovery rate.

The pH of the filtrate after hydrolysis is adjusted (S320). In this step, the pH is raised to 8 to 12 or 8 to 10. The pH adjustment can be carried out by mixing the sodium hydroxide solution under stirring.

By adjusting the pH, impurities such as Cu, Mn, Zn, Co, and Al remaining in the hydrolysis filtrate may be precipitated in the form of oxides or hydroxides to further separate them from lithium.

The hydrolysis residue and the pH adjustment residue generated in the above process are not discarded, but may be re-injected as raw materials for the smelting process, thereby minimizing the loss of valuable metals.

After pH adjustment, phosphate is added to the filtrate to obtain lithium phosphate (S330).

The reaction of the filtrate with the phosphate may be performed at room temperature to 50° C. for 20 minutes to 3 hours under stirring.

The phosphate salt may be $H_3PO_4$, $Na_3PO_4$ or $NaH_2PO_4$, and the amount used may be 1.2 to 3 or 1.2 to 1.8 equivalents of lithium.

Thereafter, the obtained lithium phosphate is washed (S340).

Washing may be performed under stirring at room temperature using water.

Various modifications are possible, such as mixing and melting of the powder-flux described above, or sequentially or mixed supply of powder and flux to the melting furnace.

Hereinafter, the present invention will be described in detail through experimental examples.

Melting Experiment

First, shreds and powder were obtained from waste electric vehicle batteries of Samsung SDI, LG Chem, and SK Innovation, and the like, through safety shredding and pulverization.

The composition of the obtained crushed material is shown in Table 1 below.

TABLE 1

| | Crushed material | | | | | | |
|---|---|---|---|---|---|---|---|
| | Li | Co | Ni | Cu | Al | Mn | Fe | C |
| % | 3.4 | 8.3 | 9.9 | 9.5 | 4.2 | 7.4 | 0.0 | 28.5 |

For the flux, FeO—$SiO_2$—CaO-based slag, a by-product of the melting process of zinc residue of Youngpoong was used. The composition of the flux is shown in Table 2.

TABLE 2

| | FeO | SiO$_2$ | CaO | Cu | Al$_2$O$_3$ | Cr | Zn |
|---|---|---|---|---|---|---|---|
| | \multicolumn{7}{c}{Clean slag} | | | | | | |
| % | 39.5 | 23.2 | 7.9 | 0.4 | 7.2 | 0.01 | 3.9 |

Figure 5A:
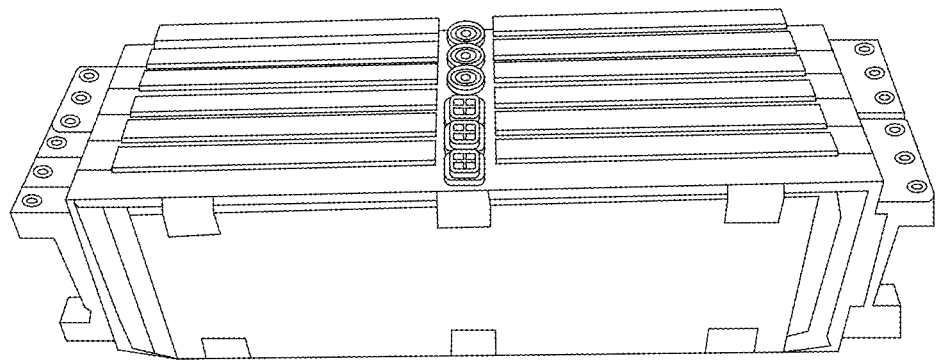
FIGS. 5A to 5D show the waste lithium secondary battery module, crushed material, powder, and flux of the waste lithium secondary battery module, used in the experimental example of the present invention, respectively.
Figure 5B:
Figure 5C:
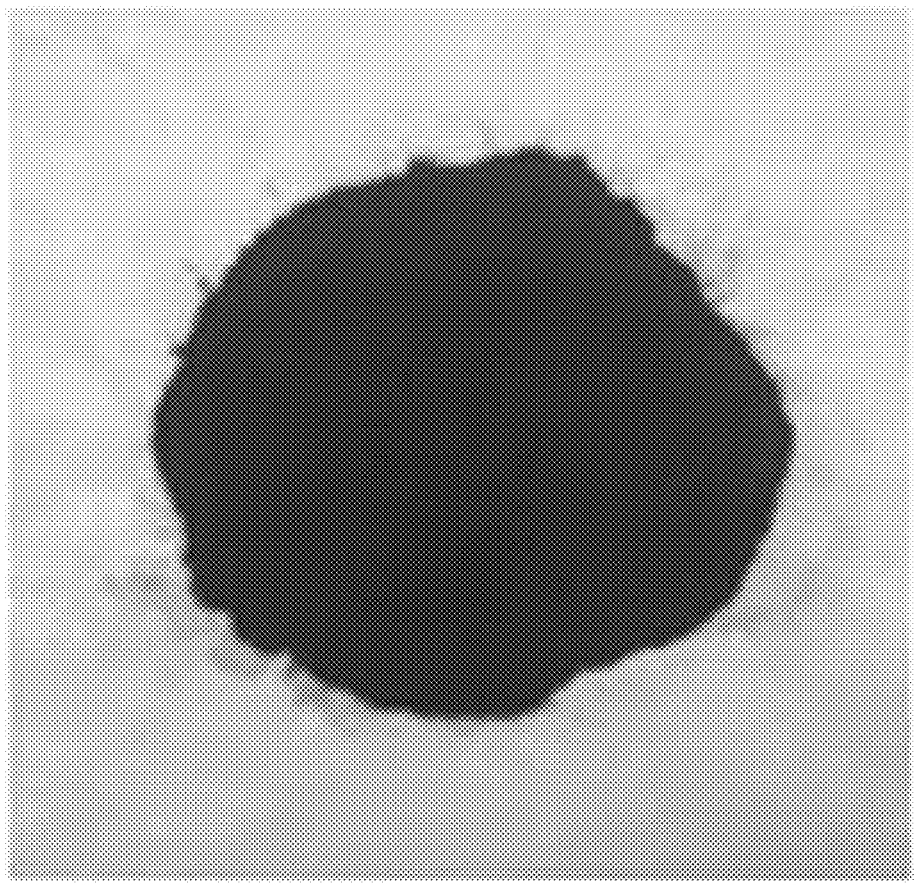
Figure 5D:

FIG. 5A is a battery module, FIG. 5B is a view of crushed material, FIG. 5C is a view of powder, and FIG. 5D is a view of flux. As the lithium recovery agent, CaCl$_2$ or CaF$_2$ was used.

After that, the crushed material, flux and lithium recovery agent are mixed in various ratios, and after reaching 1,550° C. (5° C./min elevated temperature), the processes for melting for 1 hour and O$_2$ lancing (0.6 L/min) for 3 hours and then stabilizing for 2 hours (metal/slag separation) were performed. The melting time was also changed.

Slag and Metal Phase According to Flux Usage

CaCl$_2$ was used as a lithium recovery agent so that Cl was 2.0 times the equivalent of Li, and the slag and metal phase forms were observed while changing the use ratio of crushed material and flux.

When the experiments were made with the weight ratio of the crushed material and the flux was 20:80, 40:60, 60:40, and 80:20, it was confirmed that the metal phase was poorly formed at 60:40 and 80:20 when the use amount of flux was low.

The distribution ratio of slag, metal phase, and dust in the case of using 150 parts by weight of flux relative to 100 parts by weight of crushed material is shown in Table 3 below.

TABLE 3

| Classification (%) | Li | Co | Ni | Cu | Fe | Mn |
|---|---|---|---|---|---|---|
| Slag | 7.6 | 0.7 | 0.5 | 0.3 | 98.8 | 70.5 |
| Metal phase | 0 | 96.7 | 98.6 | 96.6 | 1.2 | 27.6 |
| Dust | 92.4 | 1.6 | 0.9 | 3.1 | 0 | 1.9 |
| Total | 100 | 100 | 100 | 100 | 100 | 100 |

Table 3 shows the distribution ratio of valuable metals for each classification. The distribution ratio indicates the mass % of valuable metals distributed to each classification (slag, metal phase, dust) when the total amount is expressed as 100%.

It can be seen that most of the valuable metals which are the subject to be recovered, such as cobalt, nickel, and copper, are located in the metal, and manganese and iron, which are not subjects to be recovered, are mostly located in the slag.

Lithium Recovery Rate According to Lithium Recovery Agent Variation and Melting Time The weight ratio of the crushed material and the flux was 40:60, and the lithium recovery rate was measured while varying the amount of the lithium recovery agent for each type.

Figure 6A:
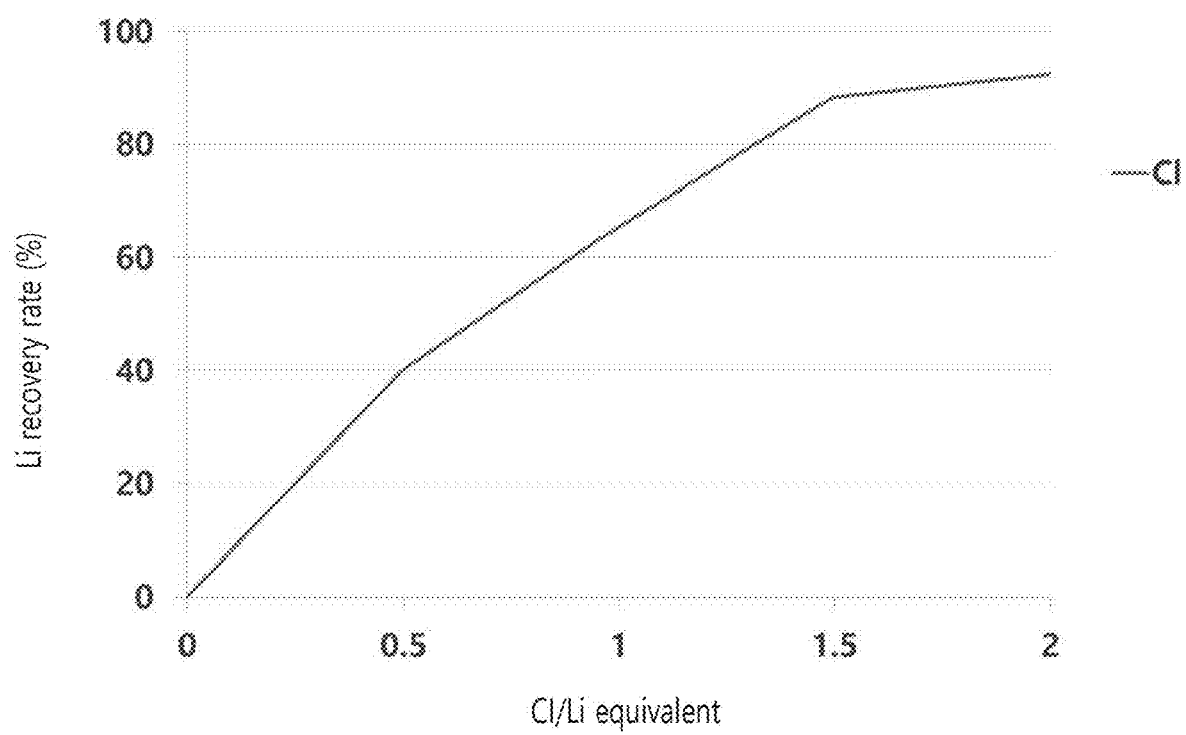
FIGS. 6A and 6B show the lithium recovery rate according to the amount of lithium recovery agent used in the experimental example of the present invention.
Figure 6B:
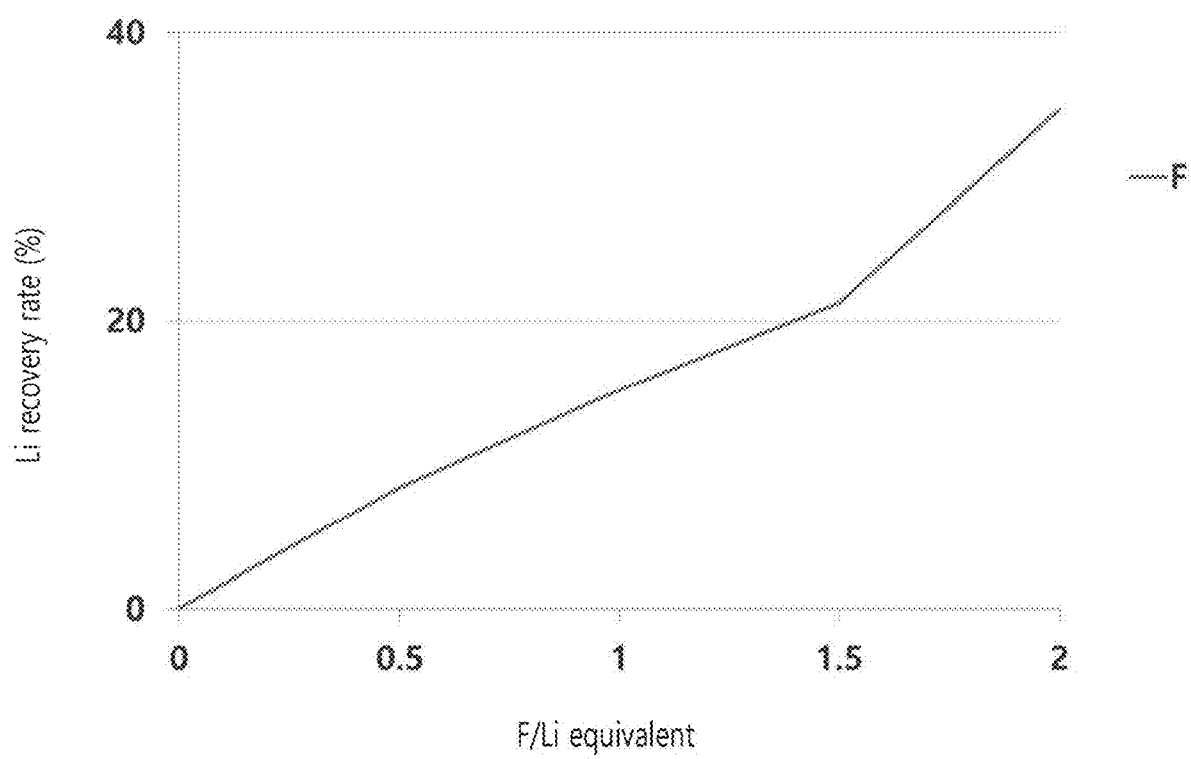

As shown in FIG. 6A, in the equivalence change of Cl/Li, a high recovery rate at the levels 88% was exhibited at 1.5 equivalence ratio. On the other hand, as shown in FIG. 6B, in the F/Li equivalent change, the recovery rate was increased as the use amount of F was increased, but the recovery rate was about 34% even at 2 equivalence ratio.

The lithium recovery rate according to the reaction time was measured under the condition that the weight ratio of the crushed material and the flux was 40:60, and the equivalent of Cl/Li or F/Li was 2.0.

Figure 7A:
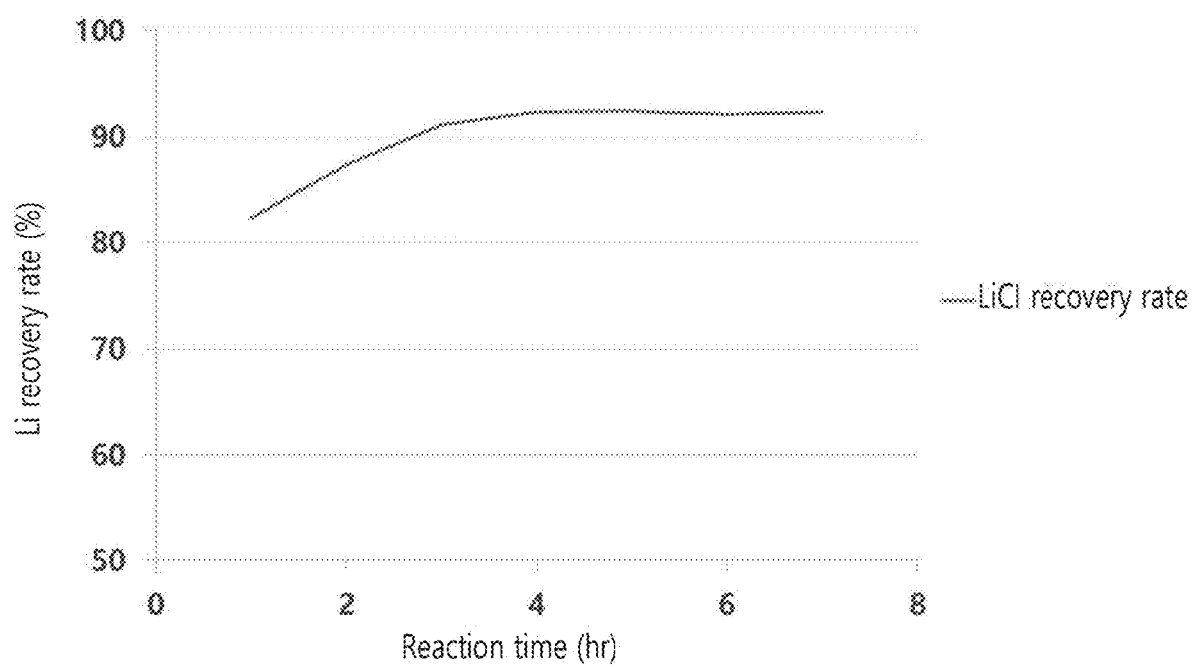
FIGS. 7A and 7B show the lithium recovery rate according to the reaction time in the experimental example of the present invention.
Figure 7B:
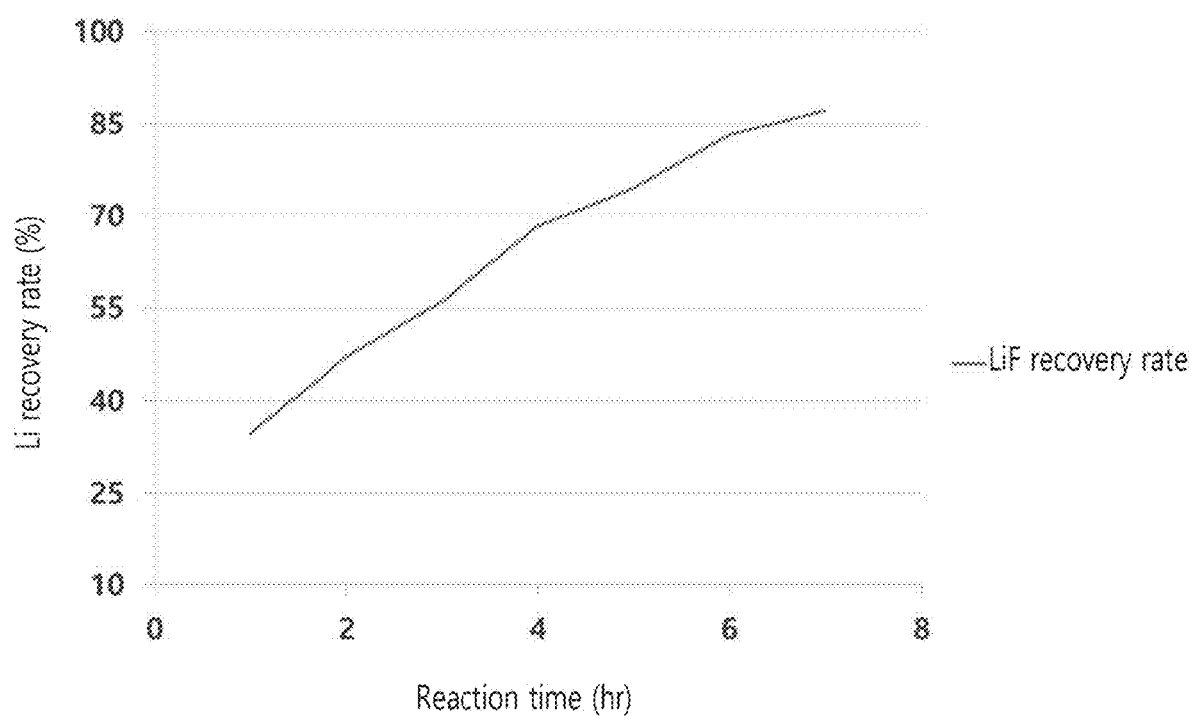

As shown in FIG. 7A, when the lithium recovery agent containing Cl was used, a recovery rate of 90% was reached from 3 hours, and when the lithium recovery agent containing F was used as shown in FIG. 7B, a recovery rate of 85% or more was obtained from 7 hours.

Preparation Example 1 of Lithium Phosphate from Lithium Compound—No Acid Added Upon Hydrolysis Lithium phosphate was prepared from lithium dust obtained under the condition that the weight ratio of the crushed material and the flux was 40:60, CaCl$_2$) was used as the lithium recovery agent, and the equivalent ratio of Cl/Li was 2.0.

First, lithium dust was analyzed, and the results are shown in FIG. 8. Lithium exists in the form of LiCl or LiCl·(H$_2$O), Li$_2$CO$_3$, and thus is the state that being easily hydrolyzed. Impurities such as Mn, Al, and Fe exist in the form of oxides, and Ni and Co exist in the form of metals.

The components of the dust are shown in Table 4, and the unit is % by weight.

TABLE 4

| | \multicolumn{8}{c}{Elements} | | | | | | | |
|---|---|---|---|---|---|---|---|---|
| | Li | Cu | Co | N | Mn | Al | Fe | Ca |
| Li dust | 11.4 | 7.36 | 0.89 | 0.49 | 3.94 | 0.18 | 0.26 | 0.54 |

Lithium dust was hydrolyzed at a concentration of 100 g/L with the condition of 30° C., 3 hr, and 250 rpm as shown in Table 5 below, and most of the Li was leached upon considering the component (output) of the leaching filtrate compared to the initial component (input). The unit is g/L.

TABLE 5

| | \multicolumn{8}{c}{Elements} | | | | | | | |
|---|---|---|---|---|---|---|---|---|
| | Li | Cu | Co | Ni | Mn | Al | Fe | Ca |
| Filtrate (Solution) | 11.21 | 0.43 | 0.35 | 0.04 | 2.86 | 0.001 | 0.001 | 0.127 |
| Leaching Efficiency (%) | 99.5 | 7.5 | 81.2 | 7.1 | 78.5 | 0.3 | 0.2 | 21.7 |

Figure 9:
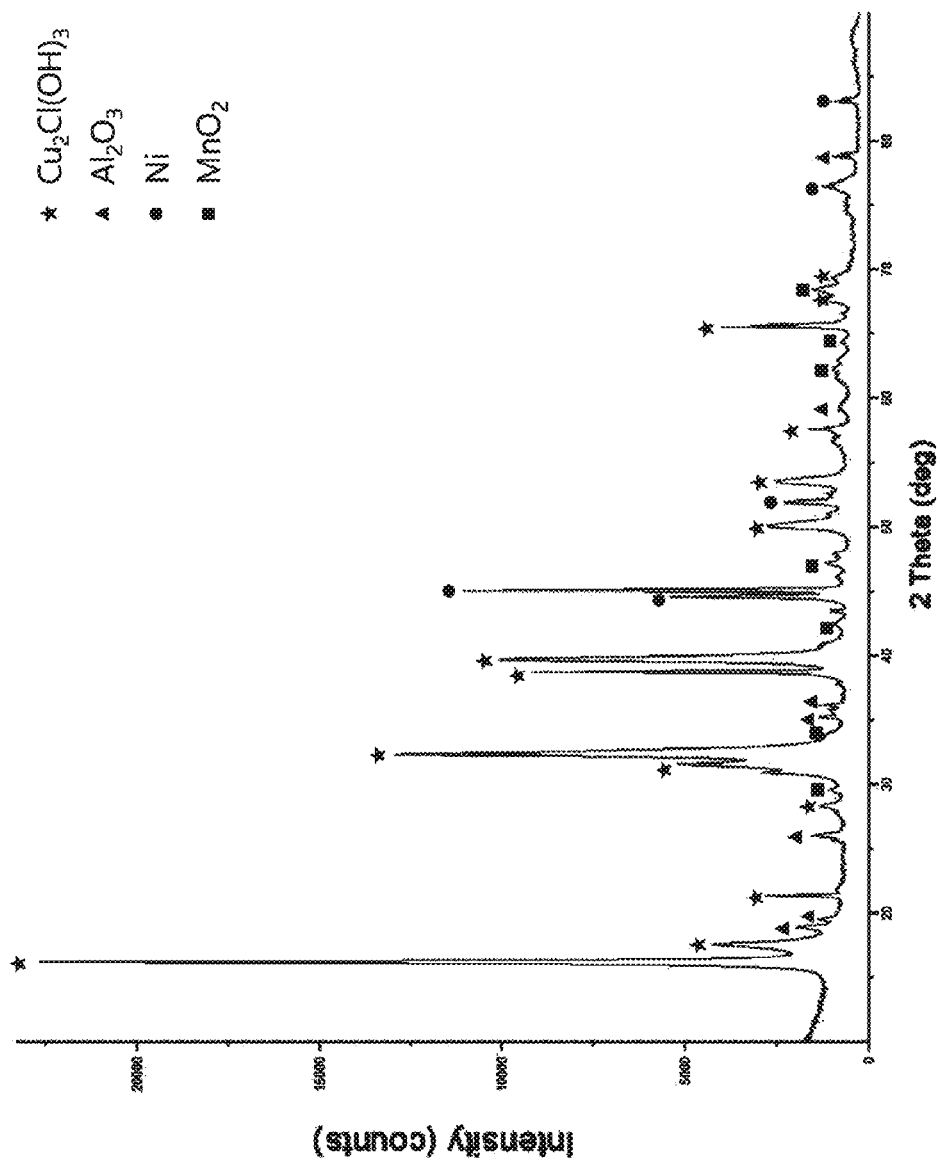
FIG. 9 shows the analysis results of the residue after hydrolysis in Preparation Example 1 of lithium phosphate without using an acid upon hydrolysis.

The analysis of residues not leached from hydrolysis is shown in FIG. 9 and Table 6 below. Cu, Ni, Fe, Mn, Co, etc. exist in the forms of oxides, metals and chlorides. The unit in Table 6 is weight %.

TABLE 6

| | \multicolumn{8}{c}{Elements} | | | | | | | |
|---|---|---|---|---|---|---|---|---|
| | Li | Cu | Co | Ni | Mn | Al | Fe | Ca |
| Residue | 0.02 | 32.08 | 0.33 | 3.38 | 1.21 | 0.09 | 0.85 | 1.52 |

Figure 10:
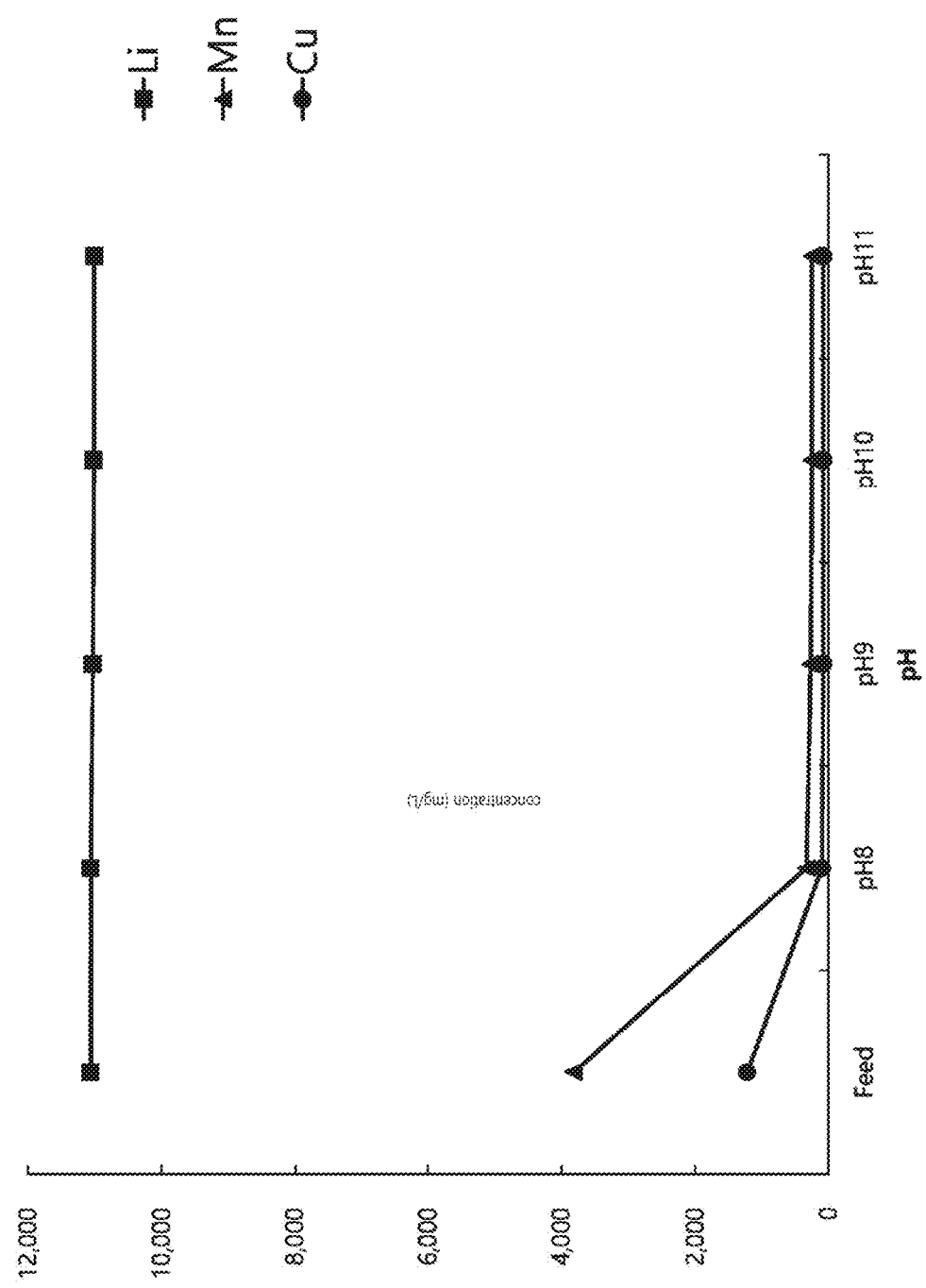
FIG. 10 shows the behavior of the metal according to pH in Preparation Example 1 of lithium phosphate without using an acid upon hydrolysis.

The pH was increased by adding 50% NaOH to the leaching filtrate at the condition of 30° C., 1 hr, and 250 rpm. As shown in FIG. 10, lithium was not precipitated at pH 8 or higher, but impurities such as Cu, Ni, Mn, Al and Ca were precipitated and removed in the form of oxides or hydroxides.

In the case of hydrolysis residues and pH-adjusted residues, they are reintroduced as raw materials for the melting process without being treated as waste, and can be recovered without loss of separated valuable metals.

Table 7 shows the composition of the filtrate at pH 11, and it can be seen that most of impurities other than Li have been removed. The unit is mg/L.

TABLE 7

| | Elements | | | | | | |
|---|---|---|---|---|---|---|---|
| | Li | Cu | Co | Ni | Mn | Al | Fe | Ca |
| Feed Solution | 11,207 | 434 | 347 | 381 | 2,862 | 1.214 | 0.986 | 127 |
| After purification | 11,149 | 0.02 | N.D | 0.01 | N.D | N.D | N.D | 0.01 |

Phosphate was added to prepare lithium phosphate from the filtrate from which impurities were further removed through pH adjustment. $H_3PO_4$ was used as phosphate, and mixing conditions were 30° C., 1 hr, and 250 rpm. As the phosphate, 1.5 equivalents of lithium were used. The above process is further described as follows.

Dust contains LiCl, LiF, $Li_2O$, and materials synthesized by Cl such as $CoCl_2$, $CaCl_2$, $MnCl_2$ (all are well soluble in water upon hydrolysis), oxides that are insoluble in water, such as $Cu_2Cl(OH)_3$, CuO, $Al_2O_3$, CoNi, $Fe_3O_4$, etc. (refers to XRD data).

Dust is dissolved in water to dissolve Li and highly soluble substances first, and when the pH of the filtered solution is raised, Co, Cu, Mn, Ca, etc. dissolved in water are precipitated as metal oxides and separated (CuO, $Co_3O_4$, MnO, $CaCO_3$, $Al_2O_3$, etc.).

Thereafter, lithium phosphate was obtained by washing with water at room temperature, 10 min, and 250 rpm.

Figure 11:
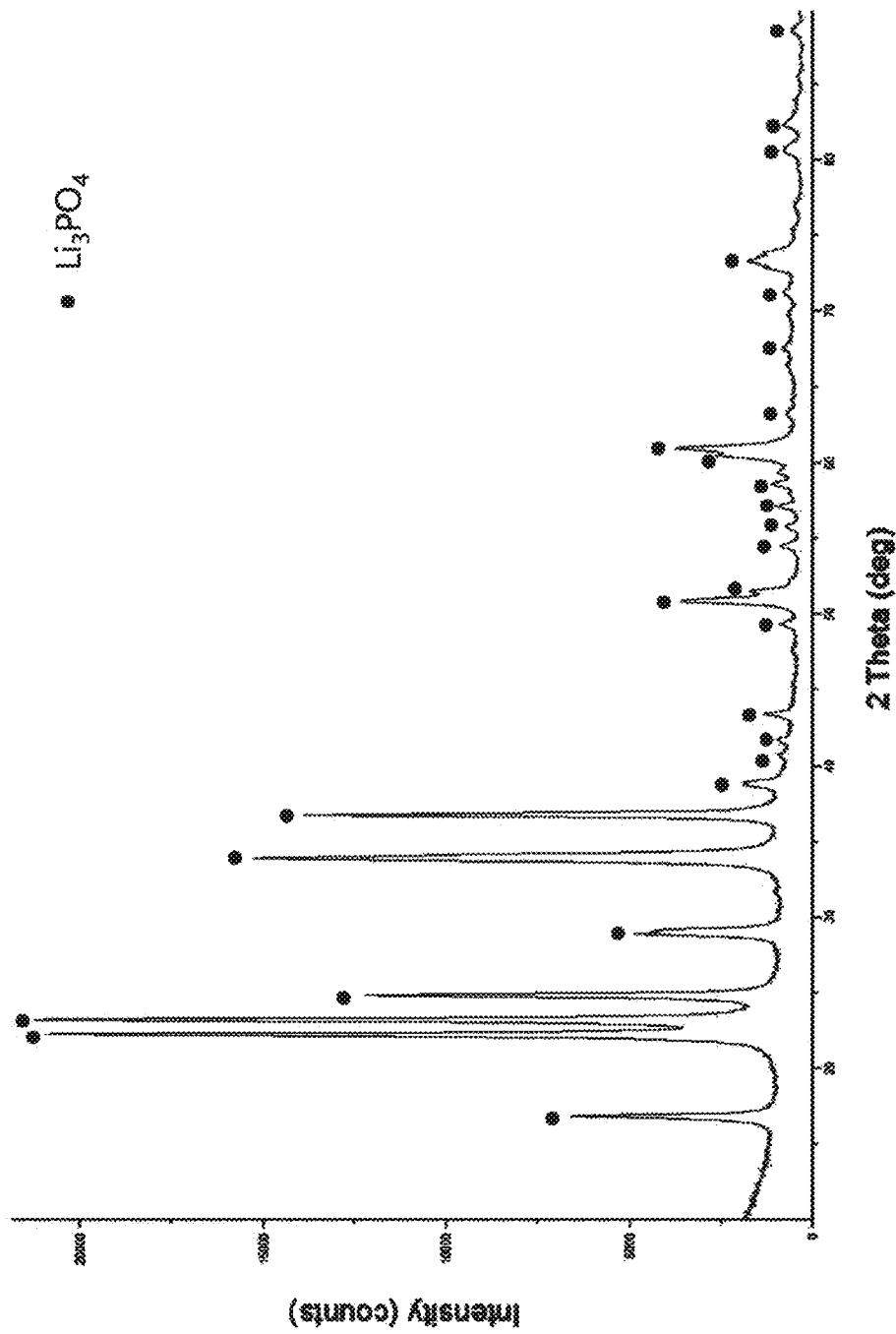
FIG. 11 shows the analysis results of lithium phosphate obtained in Preparation Example 1 of lithium phosphate without using an acid upon hydrolysis.

The analysis results of the finally obtained lithium phosphate are shown in FIG. 11 and Table 8, and the purity was 99.95%. The unit is weight %.

TABLE 8

| | Elements | | | | | | | | | | |
|---|---|---|---|---|---|---|---|---|---|---|---|
| | Na | Ca | Mg | Fe | Co | Ni | Mn | Cu | Pb | Al | Purity |
| $Li_3PO_4$ | 0.0233 | 0.0231 | 0.0003 | 0.0001 | 0.0001 | 0.0002 | 0.0002 | 0.0002 | 0.0017 | 0.0002 | 99.951 |

Preparation Example 2 of Lithium Phosphate from a Lithium Compound—Acid Added Upon Hydrolysis Lithium phosphate was prepared in the same manner as in Preparation Example 1, except that acid was used during hydrolysis.

Upon hydrolysis, hydrochloric acid was added to lower the pH to 3.

As shown in Table 9 below, when reviewing the components (output) of the leaching filtrate compared to the initial components (input), most of Li, Cu, Co, and Mn were leached.

TABLE 9

| | Elements | | | | | | | |
|---|---|---|---|---|---|---|---|---|
| | Li | Cu | Co | Ni | Mn | Al | Fe | Ca |
| Filtrate(g/L) | 11.39 | 6.32 | 0.74 | 0.26 | 3.80 | 0.001 | 0.05 | 0.20 |
| Leaching Efficiency (%) | 99.9 | 85.9 | 82.8 | 52.3 | 96.5 | 0.6 | 20.1 | 37.4 |

Figure 12:
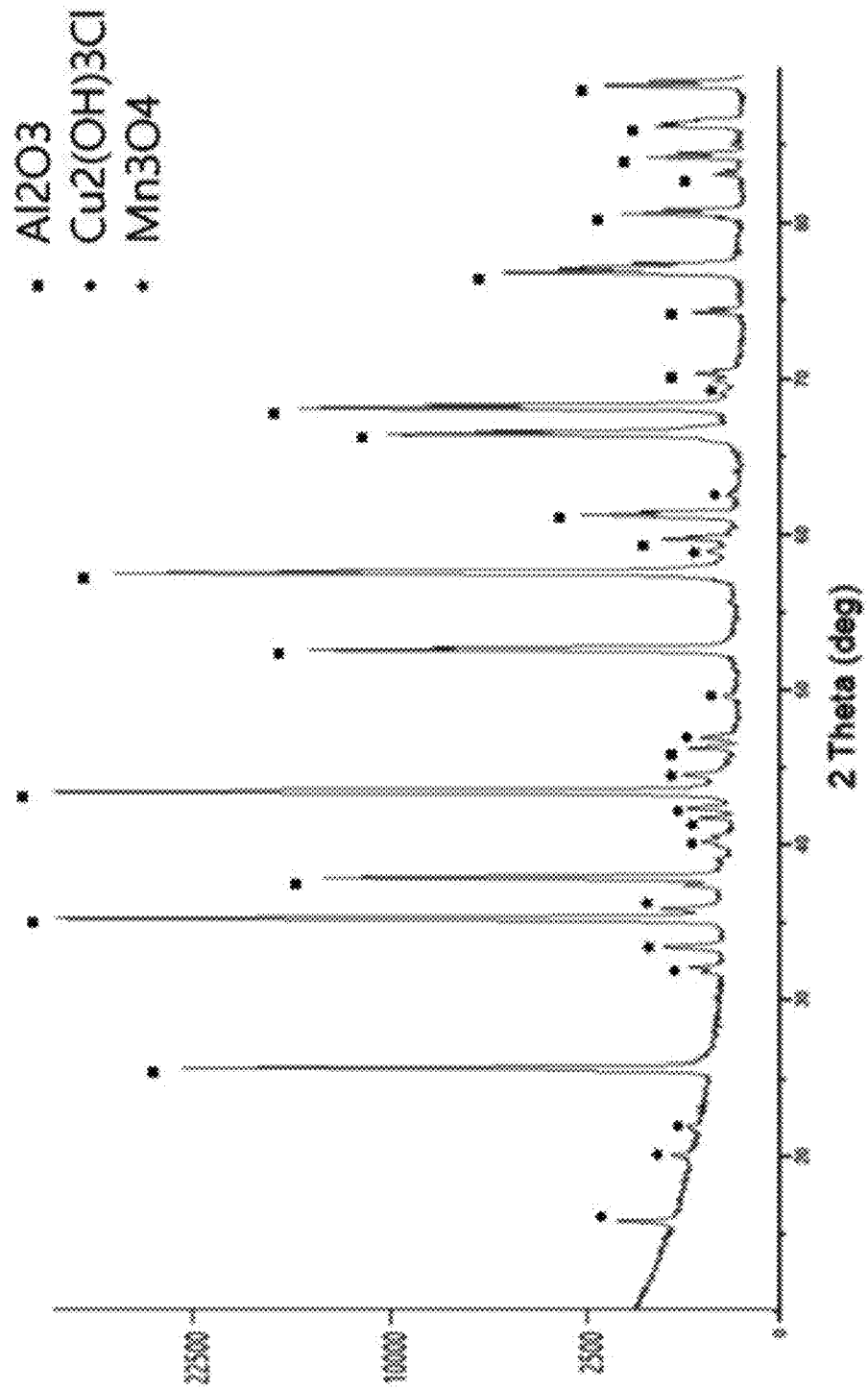
FIG. 12 shows the analysis results of the residue after hydrolysis in Preparation Example 2 of lithium phosphate using acid upon hydrolysis.

The analysis of residues not leached from hydrolysis is shown in FIG. 12 and Table 10 below, and Cu, Ni, Fe, Mn, Co, etc. exist in the form of oxides, metals and chlorides. In Table 10, the unit is % by weight.

TABLE 10

| | Elements | | | | | | | |
|---|---|---|---|---|---|---|---|---|
| | Li | Cu | Co | Ni | Mn | Al | Fe | Ca |
| Residue | 0.38 | 35.33 | 6.33 | 6.33 | 4.67 | 5.97 | 5.33 | 11.33 |

Figure 13:
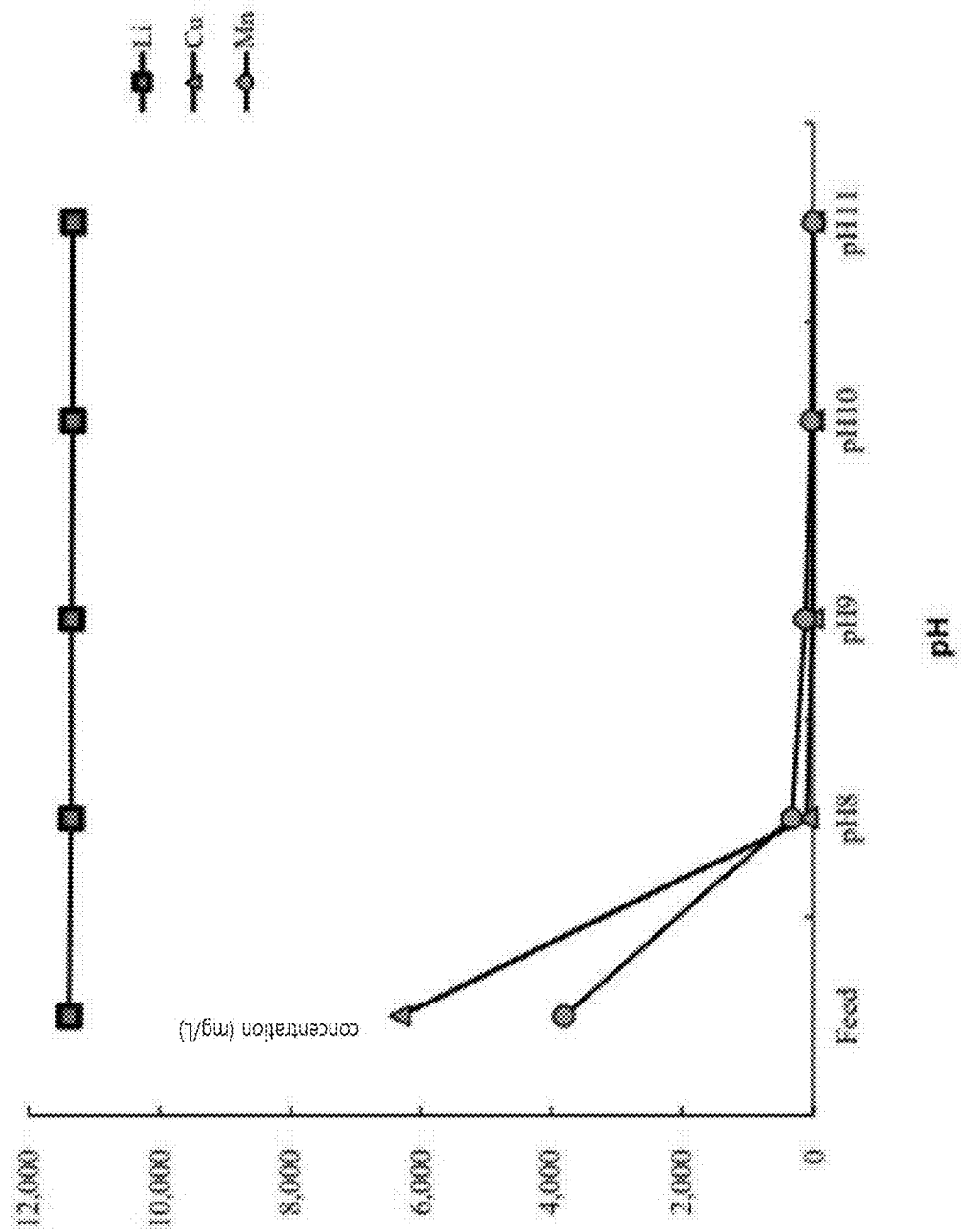
FIG. 13 shows the behavior of metals according to pH in Preparation Example 2 of lithium phosphate using acid upon hydrolysis.

The pH was increased by adding 50% NaOH to the leaching filtrate at the condition of 30° C., 1 hr, and 250 rpm. As shown in FIG. 13, lithium was not precipitated at pH 8 or higher, but impurities such as Cu, Ni, Mn, Al and Ca were precipitated and removed in the form of oxides or hydroxides. Hydrolysis residues and pH control residues are not treated as wastes and are reintroduced as the raw materials of melting process again, and thus, all of them can be recovered without loss of the valuable metals.

Table 11 shows the composition of the filtrate at pH 11, and it can be confirmed that most of impurities other than Li have been removed. The unit is mg/L.

TABLE 11

| | Elements | | | | | | | |
|---|---|---|---|---|---|---|---|---|
| | Li | Cu | Co | Ni | Mn | A | Fe | Ca |
| Feed solution | 11,388 | 6,323 | 736.6 | 256.4 | 3,803 | 1.1 | 52.2 | 202.1 |
| After purification | 11,332 | 0.022 | N.D | 0.009 | N.D | N.D | N.D | 0.011 |

Phosphate was added to prepare lithium phosphate from the filtrate from which impurities were further removed through pH adjustment. $H_3PO_4$ was used as phosphate, and mixing conditions were 30° C., 1 hr, and 250 rpm. As the phosphate, 1.5 equivalents of lithium were used. The above process is further described as follows.

Dust includes LiCl, LiF, Li$_2$O, and materials synthesized by Cl, such as CoCl$_2$, CaCl$_2$, MnCl$_2$ (all are well soluble in water during hydrolysis), oxides that are insoluble in water, such as Cu$_2$Cl(OH)$_3$, CuO, Al$_2$O$_3$, CoNi, Fe$_3$O$_4$, etc. (refer to XRD data).

In a state where the pH is lowered by dissolving dust in water and adding acid, Li and substances with high solubility are dissolved first, and when the pH of the filtered solution is raised, Co, Cu, Mn, Ca, etc. dissolved in water are precipitated as metal oxides and separated (CuO, Co$_3$O$_4$, MnO, CaCO$_3$, Al$_2$O$_3$, etc.).

Figure 14:
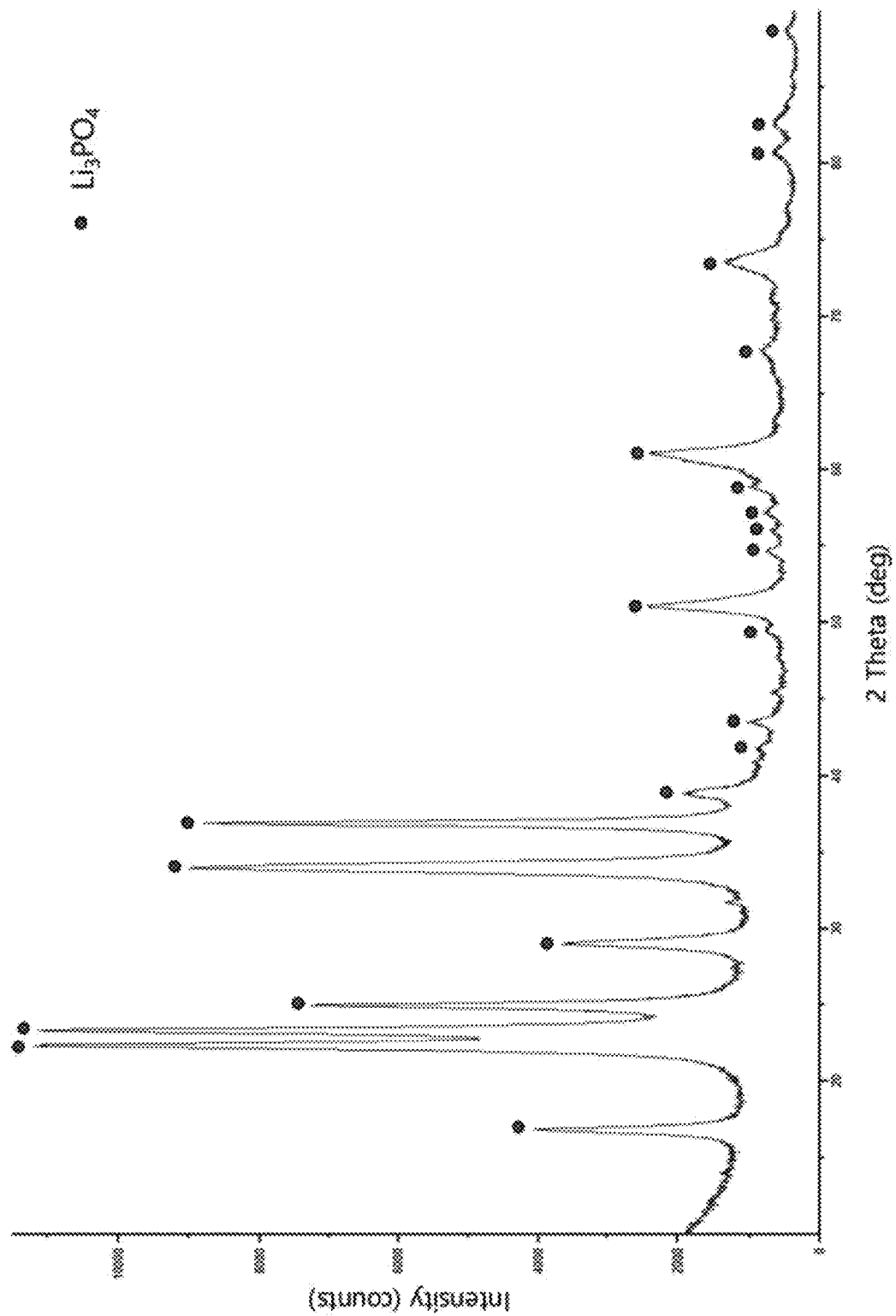
FIG. 14 shows the analysis results of lithium phosphate obtained in Preparation Example 2 of lithium phosphate using acid upon hydrolysis.

Thereafter, lithium phosphate was obtained by washing with water at room temperature, 10 min, and 250 rpm. The analysis results of the obtained lithium phosphate are shown in FIG. 14 and Table 12, and the purity was 99.95%. The unit is weight %.

TABLE 12

| | Elements | | | | | | | | | | |
|---|---|---|---|---|---|---|---|---|---|---|---|
| | Na | Ca | Mg | Fe | Co | Ni | Mn | Cu | Pb | Al | Purity |
| Li$_3$PO$_4$ | 0.0191 | 0.0201 | 0.0006 | 0.0001 | 0.0001 | 0.0002 | 0.0001 | 0.0002 | 0.0003 | 0.0002 | 99.959 |

The invention claimed is:

1. A method for recovering lithium from a waste lithium secondary battery using a pyrometallurgical smelting method, which comprises a step for melting
   a waste lithium secondary battery containing nickel, cobalt, copper and lithium, a flux having a melting temperature of 1,400° C. or less, and a lithium recovery agent to separate and obtain a slag, metal phase and lithium compound,
   wherein the lithium recovery agent includes at least one of chlorine and fluorine, and
   wherein the amount of each of the nickel, cobalt and copper contained in the metal phase is more than 10 times compared to that of the slag.

2. The method of claim 1, wherein the flux has a melting temperature of 1,250° C. or less.

3. The method of claim 1, wherein the total content of nickel, copper and cobalt is 20% by weight to 60% by weight.

4. The method of claim 1, wherein the waste lithium secondary battery comprises
   15 to 30% by weight of nickel, 3 to 10% by weight of cobalt, and 1 to 7% by weight of copper, and further comprises 20 to 40 weight percent of carbon.

5. The method of claim 1, wherein
   the waste lithium secondary battery includes a battery module, and
   the battery module is melted without crushing.

6. The method of claim 1, wherein
   the waste lithium secondary battery includes a battery module, and
   the battery module is melted after being crushed or pulverized in an inert atmosphere without being discharged.

7. The method of claim 1, wherein
   the flux comprises FeO, SiO$_2$ and CaO,
   the total content of FeO, SiO$_2$ and CaO is 65% to 85% by weight.

8. The method of claim 7, wherein
   the flux has a melting temperature of 1,000° C. to 1,250° C.,
   the SiO$_2$ is 50 to 80 parts by weight and the CaO is 15 to 40 parts by weight relative to 100 parts by weight of the FeO, and
   the flux is used in 100 parts by weight to 800 parts by weight relative to 100 parts by weight of the waste lithium secondary battery.

9. The method of claim 7, wherein the flux is obtained from the zinc residue melting process.

10. The method of claim 1, wherein
    in the melting step, said carbon is oxidized by lancing oxygen.

11. The method of claim 1, wherein the melting temperature in the melting step is 1,400° C. to 1,550° C., and
    nickel, cobalt and copper included in the waste lithium secondary battery are each contained in the metal phase in an amount of 90 weight % to 99 weight %.

12. The method of claim 1, wherein the lithium compound comprises at least one of LiCl and LiF.

13. The method of claim 11, wherein the lithium compound includes LiCl, and the molar ratio of Cl/Li upon melting is 1.3 to 2.5.

14. The method of claim 12, wherein the lithium recovery agent comprises at least any one of CaCl$_2$, CaF$_2$, FeCl$_3$, CuCl$_2$, FeF$_2$, and CuF$_2$.

15. The method of claim 12, wherein further comprises steps of:
    hydrolyzing the lithium compound;
    adjusting the pH so that the pH of the filtrate of the hydrolysis rises; and
    adding phosphate to the filtrate after the pH adjustment to obtain lithium phosphate.

16. The method of claim 15, wherein the hydrolysis is performed using only water.

17. The method of claim 15, wherein the hydrolysis is carried out in a state where the pH is lowered, and
    the pH is lowered by using of an acid.

18. The method of claim 17, wherein
in the hydrolysis,
pH is 1 to 4 and is controlled by using at least any one of sulfuric acid, nitric acid and hydrochloric acid.

* * * * *